United States Patent
Chu

(10) Patent No.: US 10,056,845 B1
(45) Date of Patent: Aug. 21, 2018

(54) POWER CONVERSION APPARATUS AND SYNCHRONOUS RECTIFICATION CONTROLLER THEREOF

(71) Applicant: Power Forest Technology Corporation, Hsinchu County (TW)

(72) Inventor: Kwan-Jen Chu, Hsinchu (TW)

(73) Assignee: Power Forest Technology Corporation, Hsinchu County (TW)

( * ) Notice: Subject to any disclaimer, the term of this patent is extended or adjusted under 35 U.S.C. 154(b) by 0 days.

(21) Appl. No.: 15/629,726

(22) Filed: Jun. 21, 2017

(30) Foreign Application Priority Data

Apr. 14, 2017 (TW) .............................. 106112688 A

(51) Int. Cl.
*H02M 3/335* (2006.01)
(52) U.S. Cl.
CPC ............................. *H02M 3/33592* (2013.01)
(58) Field of Classification Search
CPC ................................................ H02M 3/33592
See application file for complete search history.

(56) References Cited

U.S. PATENT DOCUMENTS

| | | | |
|---|---|---|---|
| 2009/0316441 A1* | 12/2009 | Hu ................... | H02M 3/33592 363/21.06 |
| 2015/0207420 A1* | 7/2015 | Wang ................ | H02M 3/33507 363/21.12 |
| 2015/0229223 A1* | 8/2015 | Cao ................... | H02M 3/33515 363/21.13 |
| 2017/0229973 A1* | 8/2017 | Ke .................... | H02M 3/33592 |
| 2017/0244333 A1* | 8/2017 | Choi ................. | H02M 3/33592 |

* cited by examiner

*Primary Examiner* — Harry Behm
(74) *Attorney, Agent, or Firm* — JCIPRNET

(57) ABSTRACT

A power conversion apparatus and a synchronous rectification (SR) controller thereof are provided. The SR controller includes a first control circuit, a second control circuit and a third control circuit. The first control circuit compares a drain voltage on a drain terminal of a SR transistor with a first voltage. When the drain voltage is lower than the first voltage, the first control circuit outputs a driving voltage to turn on the SR transistor. The second control circuit generates the driving voltage according to the drain voltage and a second voltage so as to control the SR transistor. The third control circuit compares the drain voltage with a third voltage. When the drain voltage is higher than the third voltage, the third control circuit outputs the driving voltage to turn off the SR transistor.

9 Claims, 3 Drawing Sheets

POWER CONVERSION APPARATUS AND SYNCHRONOUS RECTIFICATION CONTROLLER THEREOF

CROSS-REFERENCE TO RELATED APPLICATION

This application claims the priority benefit of Taiwan application serial no. 106112688, filed on Apr. 14, 2017. The entirety of the above-mentioned patent application is hereby incorporated by reference herein and made a part of this specification.

BACKGROUND OF THE INVENTION

Field of the Invention

The invention relates to a power apparatus, and more particularly relates to a power conversion apparatus and a synchronous rectification controller thereof.

Description of Related Art

Power conversion apparatus is an indispensable component in modern electronic apparatuses. In power conversion apparatus based on pulse width modulation (PWM) control, a secondary side of the power conversion apparatus usually has a rectifier diode. Since a power consumption of the rectifier diode is great at an on state, a synchronous rectification (SR) transistor having a lower on-resistance can be adopted to replace the rectifier diode. Given such architecture, an SR controller is still needed to control the turning on and off of the SR transistor of the secondary side.

Furthermore, a parasitic diode is between a drain terminal of the SR transistor and a body terminal thereof. When an energy stored in a primary side of the power conversion apparatus transfers to the secondary side, the parasitic diode in the SR transistor is turned on first, and then the SR controller turns on the SR transistor, causing the parasitic diode to be cut off. Similarly, the power consumption of the parasitic diode at an on state is greater compared to the power consumption of the SR transistor at an on state. Therefore, a length of on time of the parasitic diode influences the overall conversion efficiency of the power conversion apparatus.

SUMMARY OF THE INVENTION

In light of the above, the invention provides a power conversion apparatus and a synchronous rectification (SR) controller thereof. The SR controller immediately turns on an SR transistor when the drain voltage of the SR transistor is lower than the first voltage, so as to reduce a time length of on time of the parasitic diode between the drain terminal and the body terminal of the SR transistor, thereby improving the overall conversion efficiency of the power conversion apparatus.

The SR controller of the invention is configured for driving the SR transistor, the SR controller including a first control circuit, a second control circuit, and a third control circuit. The first control circuit is coupled to a drain terminal of the SR transistor to receive a drain voltage and compares the drain voltage with a first voltage. When the drain voltage is lower than the first voltage, the first control circuit outputs a driving voltage to turn on the SR transistor. The second control circuit is coupled to the drain terminal of the SR transistor to receive the drain voltage and generates the driving voltage according to the drain voltage and a second voltage to control the SR transistor. The third control circuit is coupled to the drain terminal of the SR transistor to receive the drain voltage and compares the drain voltage with a third voltage. When the drain voltage is higher than the third voltage, the third control circuit outputs the driving voltage to turn off the SR transistor.

In an embodiment of the invention, when the drain voltage is higher than the first voltage, the first control circuit stops outputting the driving voltage.

In an embodiment of the invention, when the drain voltage is lower than the third voltage, the third control circuit stops outputting the driving voltage.

In an embodiment of the invention, the second control circuit amplifies a difference voltage between the drain voltage and the second voltage to generate the driving voltage, and outputs the driving voltage to adjust a voltage level of a gate terminal of the SR transistor.

In an embodiment of the invention, when the drain voltage increases to the second voltage, the second control circuit adjusts the driving voltage to maintain the drain voltage at the second voltage.

In an embodiment of the invention, the first control circuit includes a comparator. The comparator has a first input terminal, a second input terminal, and an output terminal. The first input terminal is coupled to the drain terminal of the SR transistor to receive the drain voltage. The second input terminal is coupled to the first voltage. The output terminal is coupled to and provides the driving voltage to a gate terminal of the SR transistor.

In an embodiment of the invention, the second control circuit includes an operational amplifier. An inverting input terminal of the operational amplifier is coupled to the drain terminal of the SR transistor to receive the drain voltage. A non-inverting input terminal of the operational amplifier is coupled to the second voltage. An output terminal of the operational amplifier is coupled to and provides the driving voltage to a gate terminal of the SR transistor.

In an embodiment of the invention, the third control circuit includes a comparator. The comparator has a first input terminal, a second input terminal, and an output terminal. The first input terminal is coupled to the drain terminal of the SR transistor to receive the drain voltage. The second input terminal is coupled to the third voltage. The output terminal is coupled to and provides the driving voltage to a gate terminal of the SR transistor.

In an embodiment of the invention, the first voltage, the second voltage, and the third voltage are negative direct current voltages, wherein the first voltage is lower than the second voltage, and the second voltage is lower than the third voltage.

A power conversion apparatus of the invention includes a transformer, an SR transistor and an SR controller. The transformer has a primary side and a secondary side, wherein a first terminal of the primary side is configured to receive an input voltage, whereas a first terminal of the secondary side is configured to provide an output voltage to a load. A drain terminal of the SR transistor is coupled to a second terminal of the secondary side. A source terminal of the SR transistor is coupled to a ground terminal. A gate terminal of the SR transistor is configured to receive a driving voltage. The SR controller includes a first control circuit, a second control circuit, and a third control circuit. The first control circuit is coupled to the drain terminal of the SR transistor to receive a drain voltage and compares the drain voltage with a first voltage. When the drain voltage is lower than the first voltage, the first control circuit outputs the driving voltage to turn on the SR transistor. The second control circuit is coupled to the drain terminal of the SR transistor to receive the drain voltage and generates the driving voltage according to the drain voltage and a second voltage to control the SR transistor. The third control circuit is coupled to the drain terminal of the SR transistor to receive the drain voltage and compares the drain voltage with a third voltage. When the drain voltage is higher than the third voltage, the third control circuit outputs the driving voltage to turn off the SR transistor.

Accordingly, in the power conversion apparatus and the SR controller thereof provided in the embodiments of the invention, the first control circuit immediately turns on the SR transistor when the drain voltage of the SR transistor is lower than the first voltage, so as to reduce the time length of on time of the parasitic diode between the drain terminal and the body terminal of the SR transistor, thus decreasing power consumption of the parasitic diode, thereby improving the overall conversion efficiency of the power conversion apparatus.

To make the above and other features and advantages of the invention more comprehensible, embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
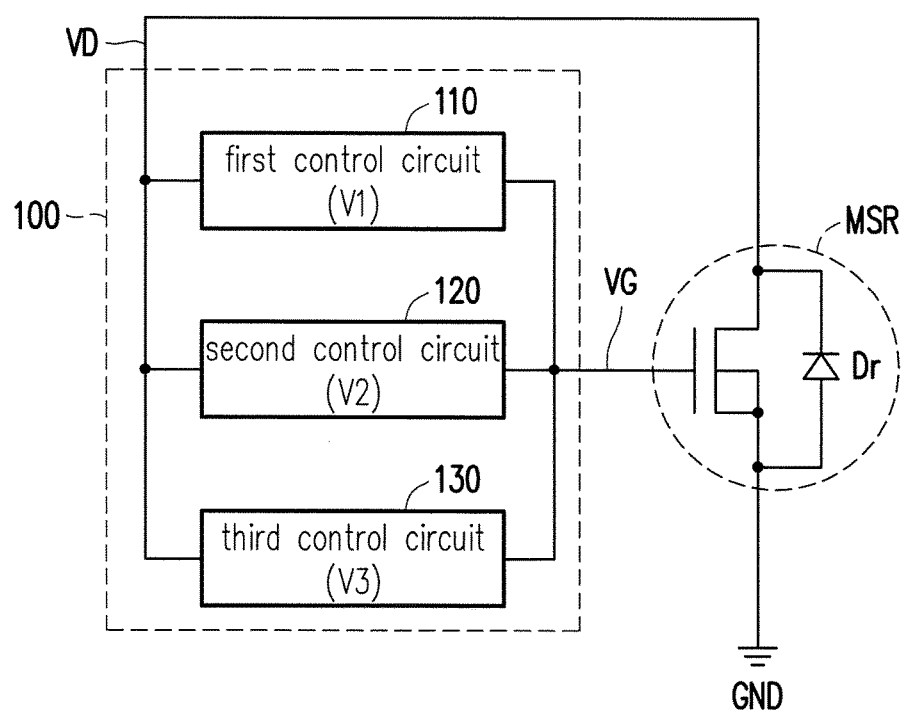
FIG. 1 is a schematic block diagram of a circuit of a synchronous rectification (SR) controller illustrated according to an embodiment of the invention.

To make the invention more easily comprehensible, embodiments are provided as follows to serve as examples that the invention can indeed be implemented accordingly. In addition, wherever possible, components/members/steps with the same reference numbers are used in the drawings and the description to refer to the same or like parts.

Referring to FIG. 1 with regard to the following, FIG. 1 is a schematic block diagram of a circuit of a synchronous rectification (SR) controller 100 illustrated according to an embodiment of the invention. The SR controller 100 is applicable to a secondary side of a power conversion apparatus (not illustrated) so as to drive an SR transistor MSR of the secondary side, wherein an architecture of the power conversion apparatus can be a flyback type, a push-pull type, a forward type, a half-bridge type, a full-bridge type or other type of architecture, and the architecture of the power conversion apparatus is not limited in the invention.

More specifically, the SR controller 100 is coupled to a drain terminal of the SR transistor MSR to receive a drain voltage VD, and coupled to a gate terminal of the SR transistor MSR to control the turning on and off of the SR transistor MSR. In addition, a source terminal and a body terminal of the SR transistor MSR are coupled to a ground terminal GND, wherein a parasitic diode Dr is between the drain terminal and the body terminal of the SR transistor MSR. In an embodiment of the invention, the SR transistor MSR can be an N-type metal-oxide-semiconductor field-effect transistor, but the invention is not limited thereto, depending on actual application or design requirement.

The SR controller 100 includes a first control circuit 110, a second control circuit 120, and a third control circuit 130. The first control circuit 110 is coupled to the drain terminal of the SR transistor MSR to receive the drain voltage VD. An output terminal of the first control circuit 110 is coupled to the gate terminal of the SR transistor MSR. The first control circuit 110 compares the drain voltage VD with a first voltage V1. When the drain voltage VD is lower than the first voltage V1, the first control circuit 110 outputs a driving voltage VG to turn on the SR transistor MSR. In contrast, when the drain voltage VD is higher than the first voltage V1, the first control circuit 110 stops outputting the driving voltage VG, namely the output terminal of the first control circuit 110 is in a state of high impedance.

The second control circuit 120 is coupled to the drain terminal of the SR transistor MSR to receive the drain voltage VD. An output terminal of the second control circuit 120 is coupled to the gate terminal of the SR transistor MSR. The second control circuit 120 generates the driving voltage VG according to the drain voltage VD and a second voltage V2 to control the SR transistor MSR.

The third control circuit 130 is coupled to the drain terminal of the SR transistor MSR to receive the drain voltage VD. An output terminal of the third control circuit 130 is coupled to the gate terminal of the SR transistor MSR. The third control circuit 130 compares the drain voltage VD with a third voltage V3. When the drain voltage VD is higher than the third voltage V3, the third control circuit 130 outputs the driving voltage VG to turn off the SR transistor MSR. In contrast, when the drain voltage VD is lower than the third voltage V3, the third control circuit 130 stops outputting the driving voltage VG, namely the output terminal of the third control circuit 130 is in a state of high impedance.

In an embodiment of the invention, the first voltage V1, the second voltage V2, and the third voltage V3 can be negative direct current voltages, but the invention is not limited thereto.

In an embodiment of the invention, the first voltage V1 is lower than the second voltage V2, and the second voltage V2 is lower than the third voltage V3.

Figure 2:
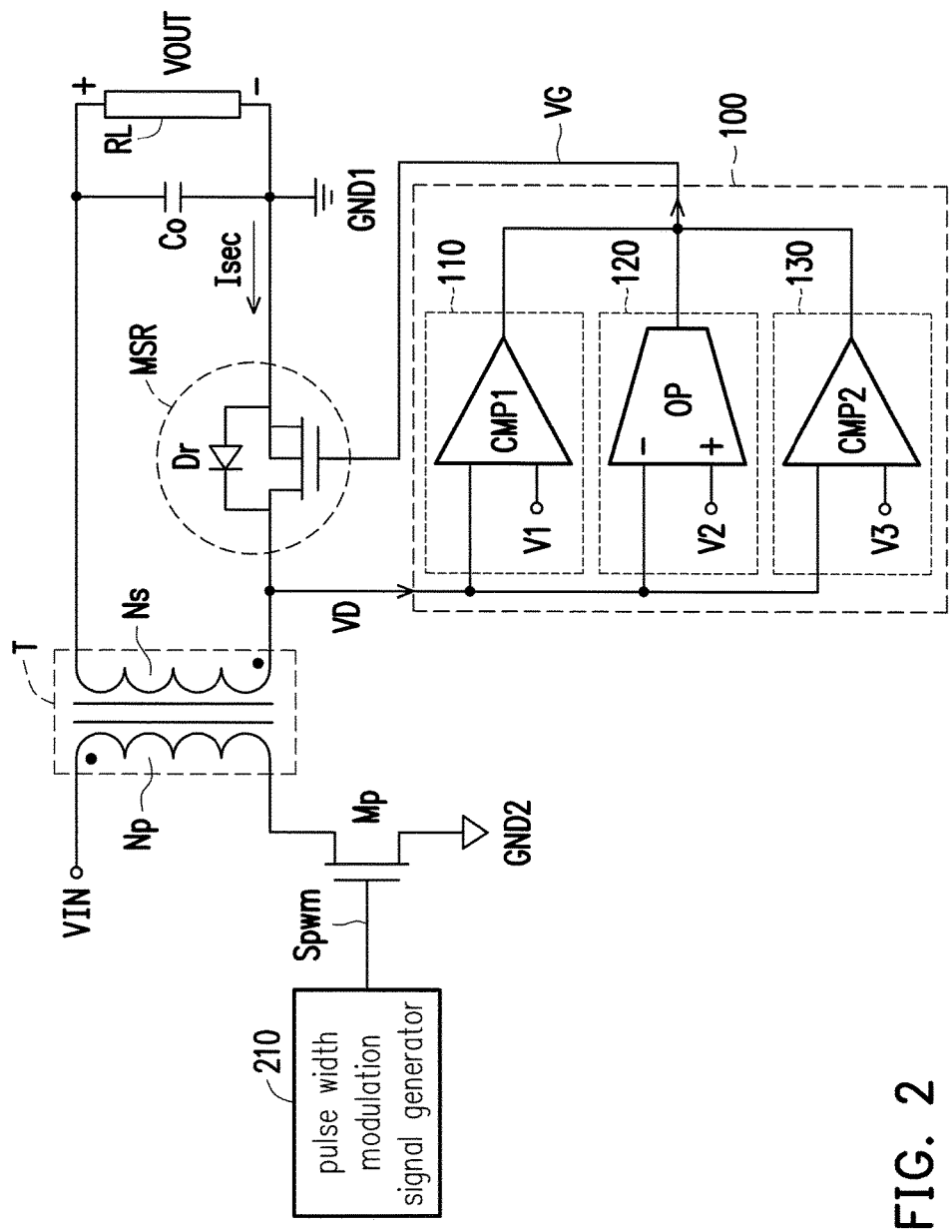
FIG. 2 is a schematic diagram of a circuit of a power conversion apparatus illustrated according to an embodiment of the invention.
Figure 3:
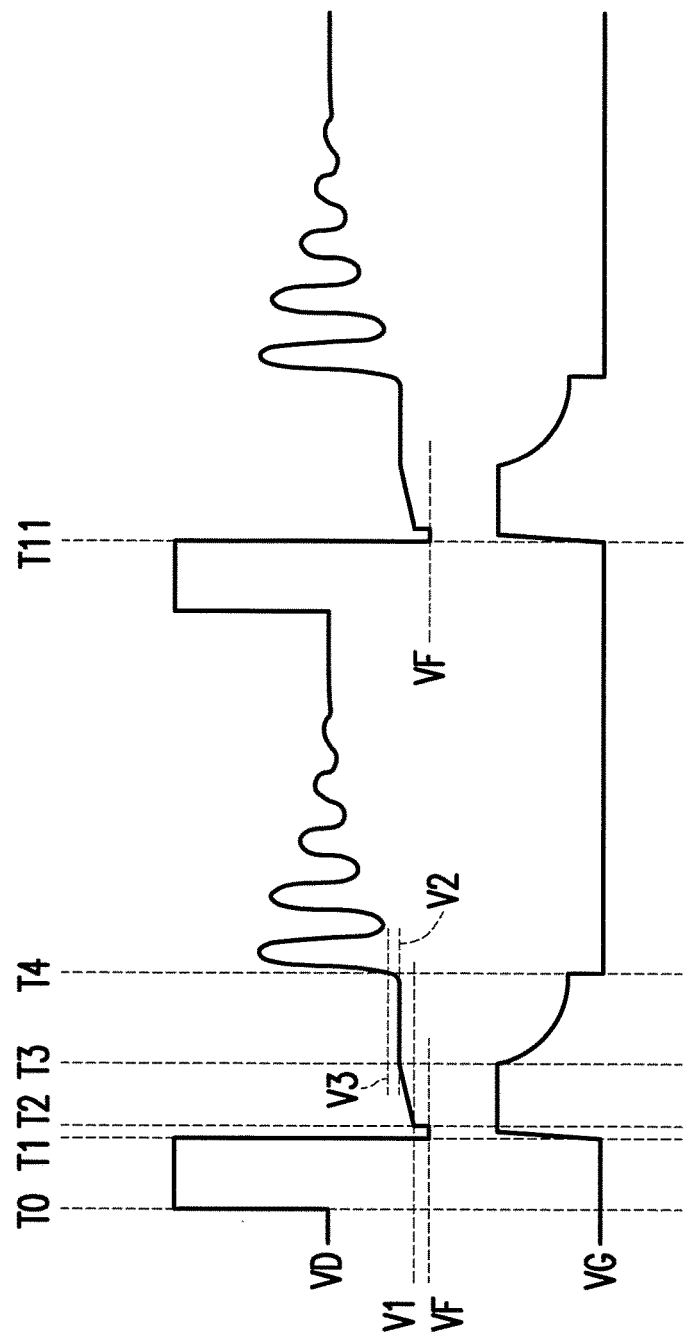
FIG. 3 is a schematic diagram of signal timing of the SR controller and an SR transistor.

The following paragraphs provide more detailed description. For convenience of explanation, description is provided herein using the power conversion apparatus with a flyback-based architecture, while the power conversion apparatus with other architectures can be analogized accordingly. Referring to FIG. 2 and FIG. 3 together, FIG. 2 is a schematic diagram of a circuit of the power conversion apparatus 20 illustrated according to an embodiment of the invention, and FIG. 3 is a schematic diagram of signal timing of the SR controller 100 and the SR transistor MSR of FIG. 2. The power conversion apparatus 20 includes a transformer T, the SR transistor MSR, the SR controller 100, a power switch Mp, and a pulse width modulation (PWM) signal generator 210, but the invention is not limited thereto. The transformer T includes a primary side Np and the secondary side Ns, wherein a first terminal (e.g., a common-polarity terminal, which is dotted) of the primary side Np is configured to receive an input voltage VIN, whereas a first terminal (e.g., an opposite-polarity terminal, which is non-dotted) of the secondary side Ns is configured to provide an output voltage VOUT to a load RL (for example, an electronic device), but the invention is not limited thereto.

A first terminal of the power switch Mp is coupled to a second terminal (e.g., an opposite-polarity terminal) of the primary side Np, a second terminal of the power switch Mp is coupled to a second ground terminal GND2, and a control terminal of the power switch Mp is coupled to the PWM signal generator 210 to receive a PWM signal Spwm. The PWM signal generator 210 generates and adjusts the PWM signal Spwm according to a status of the load RL (or a power supplying requirement).

The drain terminal of the SR transistor MSR is coupled to a second terminal (e.g., a common-polarity terminal) of the secondary side Ns, the source terminal and the body terminal of the SR transistor MSR are coupled to a first ground terminal GND1, wherein a parasitic diode Dr is between the drain terminal and the body terminal of the SR transistor MSR. The SR controller 100 is coupled to the drain terminal of the SR transistor MSR to receive the drain voltage VD. According to a voltage level of the drain voltage VD, the SR controller 100 correspondingly generates the driving voltage VG to the gate terminal of the SR transistor MSR, so as to control the SR transistor MSR. The SR controller 100 includes the first control circuit 110, the second control circuit 120, and the third control circuit 130, and the above relevant description of FIG. 1 can be referred for the coupling manner thereof.

At a time point T0 shown in FIG. 3, the power switch Mp is turned on, and the input voltage VIN provides electric power to a coil of the primary side Np of the transformer T to perform energy storage. The voltage level of the drain voltage VD is K×VIN, wherein K is a coil ratio of the secondary side Ns and the primary side Np of the transformer T. At this time, the parasitic diode Dr of the SR transistor MSR is reverse biased and at an off state. Since the voltage level of the drain voltage VD is higher than the first voltage V1 and the third voltage V3, the first control circuit 110 does not provide the driving voltage VG, namely the output terminal of the first control circuit 110 is in a state of high impedance, and the third control circuit 130 provides, for example, the driving voltage VG with logic low level to the gate terminal of the SR transistor MSR, such that the SR transistor MSR is maintained at the off state. In brief, under the circumstance that the voltage level of the drain voltage VD is higher than the third voltage V3, the SR transistor MSR is controlled by the third control circuit 130 and maintained at the off state.

At a time point T1, the power switch Mp is turned off responding to the PWM signal Spwm generated by the PWM signal generator 210. Based on Lenz's law, the energy stored in the primary side Np of the transformer T transfers to the secondary side Ns of the transformer T. Meanwhile, the parasitic diode Dr of the SR transistor MSR is forward biased and turned on. Since the body terminal of the SR transistor MSR is coupled to the first ground terminal GND1, the voltage level of the drain terminal (namely, the drain voltage VD) of the SR transistor MSR decreases from K×VIN to a negative voltage value VF. At this time, the third control circuit 130 determines that the drain voltage VD (which is the negative voltage value VF) is lower than the third voltage V3. Thus, the third control circuit 130 stops providing the driving voltage VG, namely the output terminal of the third control circuit 130 is in a state of high impedance. The first control circuit 110 determines that the drain voltage VD (which is the negative voltage value VF) is lower than the first voltage V1. Thus, the first control circuit 110 outputs, for example, the driving voltage VG with logic high level to the gate terminal of the SR transistor MSR, so as to quickly turn on the SR transistor MSR, causing the parasitic diode Dr to be quickly turned off. Therefore, compared to the driving manner of an ordinary SR controller gradually increasing the driving voltage to the logic high level, the driving manner of the first control circuit 110 of the embodiment effectively reduces a time length of on time of the parasitic diode Dr, thereby improving the overall conversion efficiency of the power conversion apparatus 20. Therefore, a current Isec of the secondary side Ns of the transformer T performs charging to a capacitance Co through an internal sensing channel of the SR transistor MSR, and provides a direct current output voltage VOUT to the load RL. In brief, under the circumstance that the voltage level of the drain voltage VD is lower than the first voltage V1, the SR transistor MSR is controlled by the first control circuit 110 and maintained at the on state.

With the energy transferred to the secondary side Ns of the transformer T continuously performing charging to the capacitance Co, the current Isec of the secondary side Ns continuously decreases, such that the voltage level of the drain voltage VD gradually increases upward from the negative voltage value VF. When the voltage level of the drain voltage VD is higher than the first voltage V1, as shown at a time point T2, the first control circuit 110 stops providing the driving voltage VG, namely the output terminal of the first control circuit 110 is in a state of high impedance. At this time, the second control circuit 120 amplifies a difference voltage between the drain voltage VD and the second voltage V2 so as to generate the driving voltage VG, and outputs the driving voltage VG to control a voltage level of the gate terminal of the SR transistor MSR.

When the voltage level of the drain voltage VD reaches the second voltage V2, as shown at a time point T3, the second control circuit 120 begins to adjust (decrease) the voltage level of the driving voltage VG to maintain the voltage level of the drain voltage VD at the second voltage V2. Since the current Isec of the secondary side Ns still continuously decreases, it ultimately causes the second control circuit 120 to be unable to maintain the voltage level of the drain voltage VD at the second voltage V2 and to increase to be higher than the third voltage V3, as shown at a time point T4. At this time, the energy stored in the transformer T has been completely delivered to the capacitance Co. Thus, the current Isec of the secondary side Ns decreases to zero. The third control circuit 130 generates, for example, the driving voltage VG of logic low level, to turn off the SR transistor MSR, until the next energy conversion is performed to cause the drain voltage VD to again decrease to the negative voltage value VF, for example, as shown at a time point T11. In brief, under the circumstance that the drain voltage VD is higher than the first voltage V1 and lower than the third voltage V3, the SR transistor MSR is controlled by the second control circuit 120. The description of embodiments of the first control circuit 110, the second control circuit 120, and the third control circuit 130 will be provided below.

In an embodiment of the invention, the first control circuit 110 includes a comparator CMP1, but the invention is not limited thereto. The comparator CMP1 has a first input terminal, a second input terminal, and an output terminal. The first input terminal of the comparator CMP1 is coupled to the drain terminal of the SR transistor MSR to receive the drain voltage VD. The second input terminal of the comparator CMP1 is coupled to the first voltage V1. The output terminal of the comparator CMP1 is coupled to and provides the driving voltage VG to the gate terminal of the SR transistor MSR. Operation of the comparator CMP1 can be analogized by referring to operation of the first control circuit 110 above, and thus is not repeated.

In an embodiment of the invention, the second control circuit 120 includes an operational amplifier OP, but the invention is not limited thereto. An inverting input terminal of the operational amplifier OP is coupled to the drain terminal of the SR transistor MSR to receive the drain voltage VD. A non-inverting input terminal of the operational amplifier OP is coupled to the second voltage V2. An output terminal of the operational amplifier OP is coupled to and provides the driving voltage VG to the gate terminal of the SR transistor MSR. Operation of the operational amplifier OP can be analogized by referring to operation of the second control circuit 120 above, and thus is not repeated.

In an embodiment of the invention, the third control circuit 130 includes a comparator CMP2, but the invention is not limited thereto. The comparator CMP2 has a first input terminal, a second input terminal, and an output terminal. The first input terminal of the comparator CMP2 is coupled to the drain terminal of the SR transistor MSR to receive the drain voltage VD. The second input terminal of the comparator CMP2 is coupled to the third voltage V3. The output terminal of the comparator CMP2 is coupled to and provides the driving voltage VG to the gate terminal of the SR transistor MSR. Operation of the comparator CMP2 can be analogized by referring to operation of the third control circuit 130 above, and thus is not repeated.

In summary of the above, in the power conversion apparatus and the SR controller thereof provided in the embodiments of the invention, the first control circuit immediately turns on the SR transistor when the drain voltage of the SR transistor is lower than the first voltage, so as to reduce the time length of on time of the parasitic diode between the drain terminal and the body terminal of the SR transistor, thus decreasing power consumption of the parasitic diode, thereby improving the overall conversion efficiency of the power conversion apparatus.

Although the invention has been described with reference to the above embodiments, it will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A synchronous rectification (SR) controller configured for driving an SR transistor, the SR controller comprising:
a first control circuit being coupled to a drain terminal of the SR transistor to receive a drain voltage and comparing the drain voltage with a first voltage, wherein when the drain voltage is lower than the first voltage, the first control circuit outputs a driving voltage to turn on the SR transistor;
a second control circuit being coupled to the drain terminal of the SR transistor to receive the drain voltage and generating the driving voltage according to the drain voltage and a second voltage to control the SR transistor; and
a third control circuit being coupled to the drain terminal of the SR transistor to receive the drain voltage and comparing the drain voltage with a third voltage, wherein when the drain voltage is higher than the third voltage, the third control circuit outputs the driving voltage to turn off the SR transistor,
wherein the second control circuit comprises:
an operational amplifier, an inverting input terminal of the operational amplifier being coupled to the drain terminal of the SR transistor to receive the drain voltage, a non-inverting input terminal of the operational amplifier being coupled to the second voltage, and an output terminal of the operational amplifier being coupled to and providing the driving voltage to a gate terminal of the SR transistor.

2. The SR controller according to claim 1, wherein when the drain voltage is higher than the first voltage, the first control circuit stops outputting the driving voltage.

3. The SR controller according to claim 1, wherein when the drain voltage is lower than the third voltage, the third control circuit stops outputting the driving voltage.

4. The SR controller according to claim 1, wherein the second control circuit amplifies a difference voltage between the drain voltage and the second voltage to generate the driving voltage, and outputs the driving voltage to adjust a voltage level of the gate terminal of the SR transistor.

5. The SR controller according to claim 1, wherein when the drain voltage increases to the second voltage, the second control circuit adjusts the driving voltage to maintain the drain voltage at the second voltage.

6. The SR controller according to claim 1, wherein the first control circuit comprises:
a comparator having a first input terminal, a second input terminal, and an output terminal, wherein the first input terminal is coupled to the drain terminal of the SR transistor to receive the drain voltage, the second input terminal is coupled to the first voltage, and the output terminal is coupled to and provides the driving voltage to the gate terminal of the SR transistor.

7. The SR controller according to claim 1, wherein the third control circuit comprises:
a comparator having a first input terminal, a second input terminal, and an output terminal, wherein the first input terminal is coupled to the drain terminal of the SR transistor to receive the drain voltage, the second input terminal is coupled to the third voltage, and the output terminal is coupled to and provides the driving voltage to the gate terminal of the SR transistor.

8. The SR controller according to claim 1, wherein the first voltage, the second voltage, and the third voltage are negative direct current voltages, and the first voltage is lower than the second voltage, and the second voltage is lower than the third voltage.

9. A power conversion apparatus comprising:
a transformer having a primary side and a secondary side, wherein a first terminal of the primary side is configured to receive an input voltage, and a first terminal of the secondary side is configured to provide an output voltage to a load;
an SR transistor, a drain terminal of the SR transistor being coupled to a second terminal of the secondary side, a source terminal of the SR transistor being coupled to a ground terminal, and a gate terminal of the SR transistor being configured to receive a driving voltage; and
an SR controller comprising:
a first control circuit being coupled to the drain terminal of the SR transistor to receive a drain voltage and comparing the drain voltage with a first voltage, wherein when the drain voltage is lower than the first voltage, the first control circuit outputs the driving voltage to turn on the SR transistor;
a second control circuit being coupled to the drain terminal of the SR transistor to receive the drain voltage and generating the driving voltage according to the drain voltage and a second voltage to control the SR transistor; and a third control circuit being coupled to the drain terminal of the SR transistor to receive the drain voltage and comparing the drain voltage with a third voltage, wherein when the drain voltage is higher than the third voltage, the third control circuit outputs the driving voltage to turn off the SR transistor, wherein the second control circuit comprises:

an operational amplifier, an inverting input terminal of the operational amplifier being coupled to the drain terminal of the SR transistor to receive the drain voltage, a non-inverting input terminal of the operational amplifier being coupled to the second voltage, and an output terminal of the operational amplifier being coupled to and providing the driving voltage to the gate terminal of the SR transistor.

\* \* \* \* \*